United States Patent

[11] 3,625,888

[72] Inventors Derek Redmore
Ballwin;
Jackie Joe Marr, Manchester, both of Mo.
[21] Appl. No. 740,022
[22] Filed June 26, 1968
[45] Patented Dec. 7, 1971
[73] Assignee Petrolite Corporation
Wilmington, Del.

[54] OXYGEN SCAVENGER SYSTEM
13 Claims, No Drawings
[52] U.S. Cl. ..................................... 252/8.55 D,
21/2.7, 166/275, 252/8.55 E, 252/188, 252/389,
260/513 B
[51] Int. Cl. ....................................... C23f 11/10,
C23f 11/16, E21b 43/16
[50] Field of Search............................ 252/8.55 D,
8.55 E, 188, 389; 21/2.7; 260/513 B; 166/275,
310, 279

[56] References Cited
UNITED STATES PATENTS
2,914,374  11/1959  Harris et al. ............... 252/188
3,042,609  9/1962   Hughes....................... 252/8.55
3,106,525  10/1963  Schmid et al. ............. 252/8.55 X
3,119,447  1/1964   Raifsnider et al. ........ 252/8.55 X
3,121,091  2/1964   Green......................... 21/2.7 X
3,169,068  2/1965   Bloch......................... 252/188

OTHER REFERENCES
Baker et al., Hydrazine as Oxygen Scavenger, Transactions of the ASME, Feb.; 1956, pp. 299– 303.
Walker, Formaldehyde, Third Edition, Pub. 1964, by Rheinhold Pub. Corp. of London, pp. 251, 252.
Gilbert, Sulfonation and Related Reactions, Pub. 1965, by Interscience Publishers, New York, 1965, pp. 157– 159.

Primary Examiner—Herbert B. Guynn
Attorney—Sidney B. Ring

ABSTRACT: A composition of matter suitable as an oxygen scavenger which is characterized as a solution of salts of a carbonyl (such as an aldehyde and/or a ketone) bisulfite addition product containing minor amounts of a transition metal such as a metal of the Iron Period of the Periodic Table, i.e., iron, cobalt, nickel, but most preferably cobalt. The oxygen scavenger may be employed to inhibit corrosion particularly in oil well waterflooding processes.

OXYGEN SCAVENGER SYSTEM

This invention relates to a composition of matter suitable as an oxygen scavenger which is characterized as a solution of salts of a carbonyl (such as an aldehyde and/or ketone) bisulfite addition product containing minor amounts of a transition metal such as those of the Iron Period of the Periodic Table, i.e., iron, cobalt, nickel, but most preferably cobalt; and to the use of such compositions as an oxygen scavenger in a wide variety of systems, such as in petroleum systems, etc.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the waterflooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of waterflooding system is referred to herein as an "open waterflooding system." If the water is recirculated in a closed system without substantial aeration, the secondary recovery method is referred to herein as a "closed waterflooding system."

Because of the corrosive nature of oil field brines, and most particularly aerated oil field brines, to economically produce oil by waterflooding, it is necessary to prevent or reduce corrosion since corrosion increases the cost thereof by making it necessary to repair and replace such equipment at frequent intervals.

In addition, in many oil fields large volumes of water are produced and must be disposed of where waterflooding operations are not in use or where waterflooding operations cannot handle the amount of produced water. Most states have laws restricting pollution of streams and land with produced waters, and oil producers must then find some method of disposing of the waste produced salt water. In many instances therefore, the salt water is disposed of by injecting the water into permeable low-pressure strata below the fresh water level. The formation into which the water is injected is not the oil producing formation and this type of disposal is defined as salt water disposal or waste water disposal. The problems of corrosion of equipment are analogous to those encountered in the secondary recovery operation by waterflooding.

Similar disposal wells are also employed for other undesired materials such as waste acids, etc.

Since the presence of air or oxygen enhances the corrosiveness of a system, it is highly desirable to remove oxygen from waterflooding system. This is particularly true of an open or aerated waterflooding system. Similar comments apply to disposal wells.

We have now discovered an oxygen scavenger system characterized by a carbonyl-bisulfite addition product and a minor amount of a transition metal such as cobalt which can be employed in aqueous media such as in waterfloods, most particularly in open or aerated waterfloods which is capable of reducing the corrosion in the system such as occurs in the metal parts of injection wells, transmission lines, filters, meters, storage tanks and other metallic implements employed therein, particularly those containing iron, steel and ferrous alloys, etc.

The oxygen scavenger system of this invention is characterized by the presence of carbonyl-bisulfite addition products such as aldehyde and/or ketone-bisulfites for example of the formula

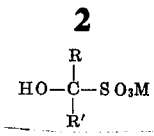

where the R and R' (which may be the same or different) are hydrogen or a substituted group, for example hydrocarbon, and most preferably alkyl, i.e., methyl, ethyl, propyl, butyl, amyl, etc.

In certain instances R may also be aryl, aralkyl, alkaryl, cycloalkyl, etc., M is a salt forming moiety such as an alkali metal salt, particularly the sodium salt which is readily available. R and R' can also be part of a ring structure such as a cyclo-alkyl ring, e.g., R+R'=—(CH$_2$)$_5$— i.e., cyclohexanone bisulfite complex.

The R groups can contain functional groups such as for example ester groups such as —CH$_2$—CO$_2$CH$_2$CH$_3$, —CO$_2$CH$_2$CH$_3$, etc.

The aldehyde and/or ketone bisulfite may also be derived from polymers such as polyacrolein bisulfite, copolymers thereof, etc. where the bisulfite addition takes place on a plurality of positions on the polymeric molecule etc. as illustrated by the generalized formula

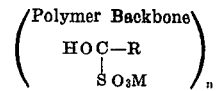

Although sodium bisulfite is well known as an oxygen scavenger and is quite widely used, the bisulfite addition compound of the carbonyl-bisulfite addition compounds of this invention offer distinct advantages over sodium bisulfite. One advantage is that of increased solubility of bisulfite in the carbonyl form allowing smaller volumes of liquid to be applied for equivalent amounts of bisulfite with obvious economic advantages. Further, the carbonyl-bisulfite additive compound serves as a reservoir for the bisulfite ion which is the active oxygen scavenger according to the following equilibrium in a time release fashion:

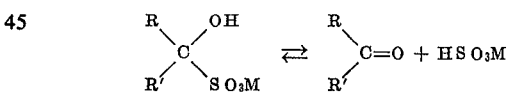

By varying the R and R' groups of the carbonyl compounds the rate at which the oxygen-scavenging bisulfite ion is available can be varied.

The exact number in which the transition metal ions catalyze the reaction of the bisulfite with oxygen is not known. However, it is possible that the metal ion attaches the bisulfite as a ligand which then reacts with oxygen to give sulfate. The sulfate ligand is then displaced by bisulfite which reacts with further oxygen.

The above are theoretical considerations which are not intended to limit the scope of the present invention.

Waterflood and waste disposal operations are too well known to require further elaboration. In essence, in the present process, the flooding operation is effected in the conventional manner except that the flooding medium contains a minor amount of the scavenging composition compound, sufficient to prevent corrosion, in concentrations of about 1 to 1,000 p.p.m., or more, for example 1-250 p.p.m., but preferably 1-100 p.p.m. The upper limiting amount of reducing compounds is determined by economic considerations. Since the success of a waterflooding operation manifestly depends upon its total cost being less than the value of the additional oil recovered from the oil reservoir, it is quite important to use as little as possible of these reducing compounds consistent with optimum corrosion inhibition. Optimum performance is generally obtained employing 5–100 p.p.m. Since these compounds are themselves inexpensive and are used in low concentrations, they enhance the success of a flood operation by lowering the cost thereof.

The weight ratio of the transition metal (as the metal itself) to the carbonyl-bisulfite addition product may be any effective amounts, for example from about 0.01 to 10 percent, such as from about 0.1 to 5 percent, but preferably about 0.1 to 2 percent. The metal is generally employed in salt forms such as for example the halide, etc.

It is to be understood that this ratio can vary with the particular system, the particular addition product, etc. In practice optimum results are obtained with cobalt in ratios of from about 0.05 to 5 percent.

The carbonyl-bisulfite addition products are added to the corrosive system from solution of concentrates which in general contain at least about 15 percent of the carbonyl-bisulfite addition product, such as at least about 20 percent, but preferably at least about 25 percent; and at least about 0.05 percent transition metal, such as at least about 0.1 percent, but preferably at least about 0.25 percent.

In practice one employs a solution an aqueous solution of about 10 to 40 percent of the carbonyl-bisulfite addition product such as about 20 to 35 percent, but preferably about 25 to 30 percent and about 0.01 to 5 percent of the transition metal, such as about 0.05 to 2 percent but preferably about 0.1 to 0.5 percent.

The carbonyl-bisulfite addition product is prepared by simply mixing an aqueous solution of the carbonyl compound and the bisulfite at ambient temperature, preferably at room temperatures, and most preferably below about 40° C. An excess of the bisulfite is generally employed. Thereupon, the transition metal is added thereto. This solution can be added if desired directly as an oxygen scavenger to the system to be treated.

The following examples are presented for purposes of illustration and not of limitation.

EXAMPLES

The oxygen scavenging compositions of this invention were actually tested in field operation on an open waterflood project in West Texas. In this field test the compositions of this invention were compared directly with the competitive commercial compound selected for the project. In order to monitor the performance of the oxygen scavenging compositions a Beckman polarographic oxygen meter with the sensing electrode installed in the injection fluids was used. The oxygen levels were recorded continuously by means of a chart recorder connected to the oxygen meter. Oxygen levels were recorded first for the system without any scavenger and then with the commercial material followed by the compositions of this invention. Adequate time elapsed between the use of the two chemicals to avoid contamination. The oxygen scavengers were injected continuously into the system to effect the oxygen scavenging. The results in the following table show the effectiveness of the compositions of this invention and the superiority over the competitive commercial product. The p.p.m. are based on active material.

TABLE

| Concentration of Oxygen Scavenger | Oxygen level in p.p.m. |
| --- | --- |
| None | 3.80 |
| Competitive compound 100 p.p.m. | 2.65 |
| Composition of this invention* 50 p.p.m. | 0.0 |

*This had the following composition:

| Sodium Bisulfite | 24.00% by weight |
| --- | --- |
| Acetone | 9.23% |
| Cobalt Chloride | 0.50% |
| Water | 66.27% |
| Total | 100.00% |

While the flooding medium employed in accordance with the present invention contains water or oil field brine and the oxygen scavenging system the medium may also contain other materials. For example, the flooding medium may also contain other agents such as corrosion inhibitors, surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in waterflooding and water disposal processes, for example five spot flooding, peripheral flooding, etc., and in conjunction with other secondary recovery methods.

We claim:
1. An oxygen scavenger system consisting essentially of an aqueous solution of
   A. a carbonyl-bisulfite addition product selected from the group consisting of
      1. a product of the formula

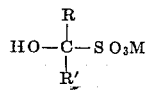

wherein
   R is hydrogen, methyl, ethyl, propyl, butyl, amyl, —CH$_2$—CO$_2$CH$_2$CH$_3$ or —CO$_2$CH$_2$CH$_3$,
   R' is hydrogen, methyl, ethyl, propyl, butyl, amyl, —CH$_2$—CO$_2$CH$_2$CH$_3$ or —CO$_2$CH$_2$CH$_3$, and
   M is an alkali metal with the proviso that R and R' are the same or different, and
   2. a product of the formula

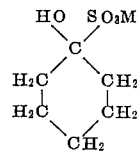

wherein M is an alkali metal, and
   B. a halide of a transition metal selected from the group consisting of iron, cobalt and nickel, (A) being present in the amount of about 10 to about 40 percent by weight and said transition metal of (B) being present in the amount of about 0.01 to about 5 percent by weight in the aqueous solution.

2. The oxygen scavenger system of claim 1 where the transition metal is cobalt.

3. The oxygen scavenger system of claim 1 where
   A. is a product of the formula

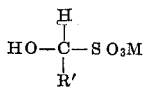

4. The oxygen scavenger system of claim 3 where the transition metal is cobalt.

5. The oxygen scavenger system of claim 2 where
   A. is a product of the formula

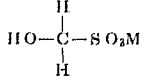

6. The oxygen scavenger system of claim 1 where A. is a product of the formula

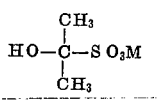

7. The oxygen scavenger system of claim 6 where the transition metal is cobalt.

8. The oxygen scavenger system of claim 7 where M is sodium and the halide of cobalt is cobalt chloride.

9. The process of recovering oil from an oil well by flooding with a flooding medium selected from the group consisting of water and oil field brine characterized by adding to said medium the oxygen scavenger system of claim 1 in an amount sufficient to prevent corrosion.

10. The process of recovering oil from an oil well by flooding with a flooding medium selected from the group consisting of water and oil field brine characterized by adding to said medium the oxygen scavenger system of claim 4 in an amount sufficient to prevent corrosion.

11. The process of recovering oil from an oil well by flooding with a flooding medium selected from the group consisting of water and oil field brine characterized by adding to said medium the oxygen scavenger system of claim 5 in an amount sufficient to prevent corrosion.

12. The process of recovering oil from an oil well by flooding with a flooding medium selected from the group consisting of water and oil field brine characterized by adding to said medium the oxygen scavenger system of claim 7 in an amount sufficient to prevent corrosion.

13. The precess of recovering oil from an oil well by flooding with a flooding medium selected from the group consisting of water and oil field brine characterized by adding to said medium the oxygen scavenger system of claim 8 in an amount sufficient to prevent corrosion.

* * * * *